(12) United States Patent
Kagawa (10) Patent No.: US 7,065,772 B2
(45) Date of Patent: Jun. 20, 2006

(54) MOTIVE-FORCE TRANSMISSION CHANGEOVER MECHANISM IN DISC APPARATUS

(75) Inventor: Yoshiharu Kagawa, Fukui (JP)

(73) Assignee: Orion Electric Co., Ltd., Fukui (JP)

( * ) Notice: Subject to any disclaimer, the term of this patent is extended or adjusted under 35 U.S.C. 154(b) by 337 days.

(21) Appl. No.: 10/694,052

(22) Filed: Oct. 28, 2003

(65) Prior Publication Data

US 2004/0205786 A1    Oct. 14, 2004

(30) Foreign Application Priority Data

Oct. 30, 2002    (JP) .............................. 2002-315792

(51) Int. Cl.
 *G11B 17/04*    (2006.01)
(52) U.S. Cl. .................................................. 720/608
(58) Field of Classification Search ................ 720/601, 720/604, 607, 608, 609, 613
See application file for complete search history.

(56) References Cited

U.S. PATENT DOCUMENTS 5,128,918 A * 7/1992 Suzuki et al. ............... 720/608
5,218,593 A * 6/1993 Kaneo et al. ............... 720/608
5,381,393 A * 1/1995 Ohtani ........................ 720/604
6,208,606 B1* 3/2001 Saito ........................... 720/609
6,345,027 B1* 2/2002 Saji et al. .................... 720/607
2005/0223397 A1* 10/2005 Arase ......................... 720/601

FOREIGN PATENT DOCUMENTS

JP    2000-222803    8/2000

* cited by examiner

*Primary Examiner*—Tianjie Chen
(74) *Attorney, Agent, or Firm*—Wenderoth, Lind & Ponack, L.L.P.

(57) ABSTRACT

To make the shape of parts simple, the transmission changeover well timed and reliable, and the size reduce, a transmission changeover mechanism in a disc apparatus includes a rotary control piece which is spring-biased to rotate in one direction, and has a transmission switching gear wheel fixed thereto. A retainer post stands on the chassis prevents rotation of the rotary control piece. A catch pin stands the rotary control piece. A cam rib is formed on lower surface of the traverse rack in confronting relation with the rotary control plate which is so configured as to make the rotary control piece release from the retainer post, and at the same time make the catch pin follow the rib contour, thereby allowing the transmission switching gear wheel to couple or decouple from the tray feeding gear wheel.

4 Claims, 12 Drawing Sheets

MOTIVE-FORCE TRANSMISSION CHANGEOVER MECHANISM IN DISC APPARATUS

BACKGROUND OF THE INVENTION

1. Field of the Invention

The present invention relates to a motive-force transmission changeover mechanism in a disc apparatus of the type having a disc carrying tray to carry a disc for loading and unloading in which a single motor is used for driving the tray, the raising and lowering of the traverse unit, and the forward and backward movements of the optical pickup.

2. Related Art

The principal movements in such type of disc apparatus include: turning the turntable; moving the optical pickup for recording and/or reproducing sound and/or pictures from the disc; moving the disc carrying tray between the projecting position in which the disc can be put on or removed from the tray and the withdrawing position in which the disc can be put on or removed from the turntable; and inclining the traverse unit to prevent the advancing disc from hitting the traverse unit, which otherwise, would remain in the way to the loading position.

JP2000-222803(A) shows an Optical Disc Apparatus which is so designed that the number of the drive motors allotted to the above described different modes of operation is reduced to minimum. Specifically the proposed Optical Disc Apparatus uses a first drive motor for rotating the turntable and a second drive motor capable of: rotating in opposite directions for moving back and forth the pickup across the disc; raising and lowering the traverse unit and moving back and forth the disc-carrying tray. The Optical Disc Apparatus is equipped with a motive-force transmission changeover mechanism to change over the driving force of the second motor between the tray driving mechanism and the pickup driving mechanism. The motive-force transmission changeover mechanism is built in the mechanism for raising and lowering the traverse unit.

The motive-force transmission changeover mechanism comprises a changeover rack and cam slot formed on the traverse rack, a trigger lever rotatably fixed to the traverse chassis, a lock lever slidably fitted in the cam slot of the traverse rack, and other associated parts. Further it comprises a cam gear having a cam slot made on its circumference for raising and lowering the front end of the traverse unit. The cam gear is meshed with the last one of a gang of gear wheels, which timely conveys the driving force from the second motor to the tray driving mechanism, the traverse unit inclining mechanism or the pickup driving mechanism. Thus, the single motor can be used in effecting movement of the optical pickup, inclination of the traverse unit and reciprocation of the disc-carrying tray.

However, the parts such as the trigger lever having changeover rack and gear portion, the lock lever, cam gear having a portion lacking teeth and the like to make up the motive-force transmission changeover mechanism are complicated in shape, and the assembly of such complicated parts often cannot work well because they are difficult to work together toward their timely cooperation, e.g. an engaging timing between the changeover rack and the trigger lever; a timing for the trigger lever to rotate the cam gear. As a matter of fact, such motive-force transmission changeover mechanism is hardly reliable in operation.

To assure that the prior art motive-force transmission changeover mechanism works reliably, such complicated parts need to be made with extreme precision, and the so made parts need to be arranged and placed relative to each other with as high precision as are required in making them. Also disadvantageously the metal molds for producing such precision parts are very expensive, and extra spaces are required for some separate parts such as the trigger lever and lock lever, not allowing reduction of the whole size of the disc apparatus so far.

In view of the above one object of the present invention is to provide an improved motive-force transmission changeover mechanism for use in a disc apparatus capable of working together in unison by a single motor, the parts of the motive-force transmission changeover mechanism being simple, well timed and reliable of the transmission changeover, and the size can be reduced.

SUMMARY OF THE INVENTION

To attain this object a motive-force transmission changeover mechanism in a disc apparatus according to the present invention comprises: a traverse unit; an optical pickup fixed on the traverse unit and adapted to run on parallel guide rails laid on a chassis of the traverse unit; a traverse holder holding the traverse unit via shock-absorbing members; a drive motor; and a disc-carrying tray to carry a disc for loading and unloading; an optical pickup drive mechanism having a traverse rack integrally connected to the optical pickup, and a gang of gear wheels to be detachably connected to the traverse rack for transmission of driving power of the drive motor; a traverse unit inclining mechanism having a lateral slider having an oblique cam slot and a rack, a forward projection of the traverse holder slidably fitted in the oblique cam slot, and a tray feeding pinion detachably mesh with the rack of the lateral slider; and a tray driving mechanism including a tray rack, an L-shaped cam slot both formed on rear surface of the disc-carrying tray, and a tray feeding gear wheel concentrically combined with the tray feeding pinion, wherein a rotary control piece is pivotally fixed on the chassis of the traverse unit and being spring-biased to rotate in one direction; a retainer post stands upright on the chassis to prevent rotation of the rotary control piece; an intervening transmission switching gear wheel which makes the tray feeding gear wheel couple or decouple from the gang of gear wheels is rotatably fixed on the rotary control piece; a catch pin is fixed on the upper surface of the rotary control piece; and a cam rib is formed on lower surface of the traverse rack in confronting relation with the rotary control plate which is so configured as to make the rotary control piece release from the retainer post, and at the same time make the catch pin follow the rib contour, thereby allowing the transmission switching gear wheel to couple or decouple from the tray feeding gear wheel.

With this arrangement the timing for the transmission switching gear wheel to mesh with the tray feeding pinion is determined by the size and positioning of the rotary control piece and the cam rib, and they are set up within a predetermined area before releasing the engagement between the traverse rack and the pinion in the gang of gear wheels. The timing is adjustable within a certain width according to the size and positioning of the rotary control piece, assuring to have enough adjusting width and enabling good timing of motive-force transmission changeover without being required of strict allowance in determining their sizes and relative positions. Also, all parts of the transmission changeover mechanism are positioned between the traverse rack and the chassis of the traverse unit, requiring no extra spaces. This contributes significant reduction of the whole size of the disc apparatus.

The traverse rack may have a chamfered end whereas the lateral slider has a guide piece its end so chamfered as to be complementary with the chamfered end of the traverse rack, whereby forward movement of the traverse rack laterally drives the lateral slider to allow the rack of the lateral slider to mesh with the tray feeding pinion.

The cam rib may be consisted of a trapezoid unlocking section for releasing the rotary control piece from the retainer post, and a subsequent curved rotation-controlling section for the catch pin to slide thereon.

The trapezoid unlocking section and the curved rotation-controlling section of the cam rib are so sized, shaped and positioned that the transmission switching gear wheel is coupled with the tray feeding gear wheel before the lateral slider reaches the end of the lateral travel, and before the traverse rack is disconnected from a pinion in the gang of gear wheels.

DETAILED DESCRIPTION OF PREFERRED EMBODIMENT

Figure 1:
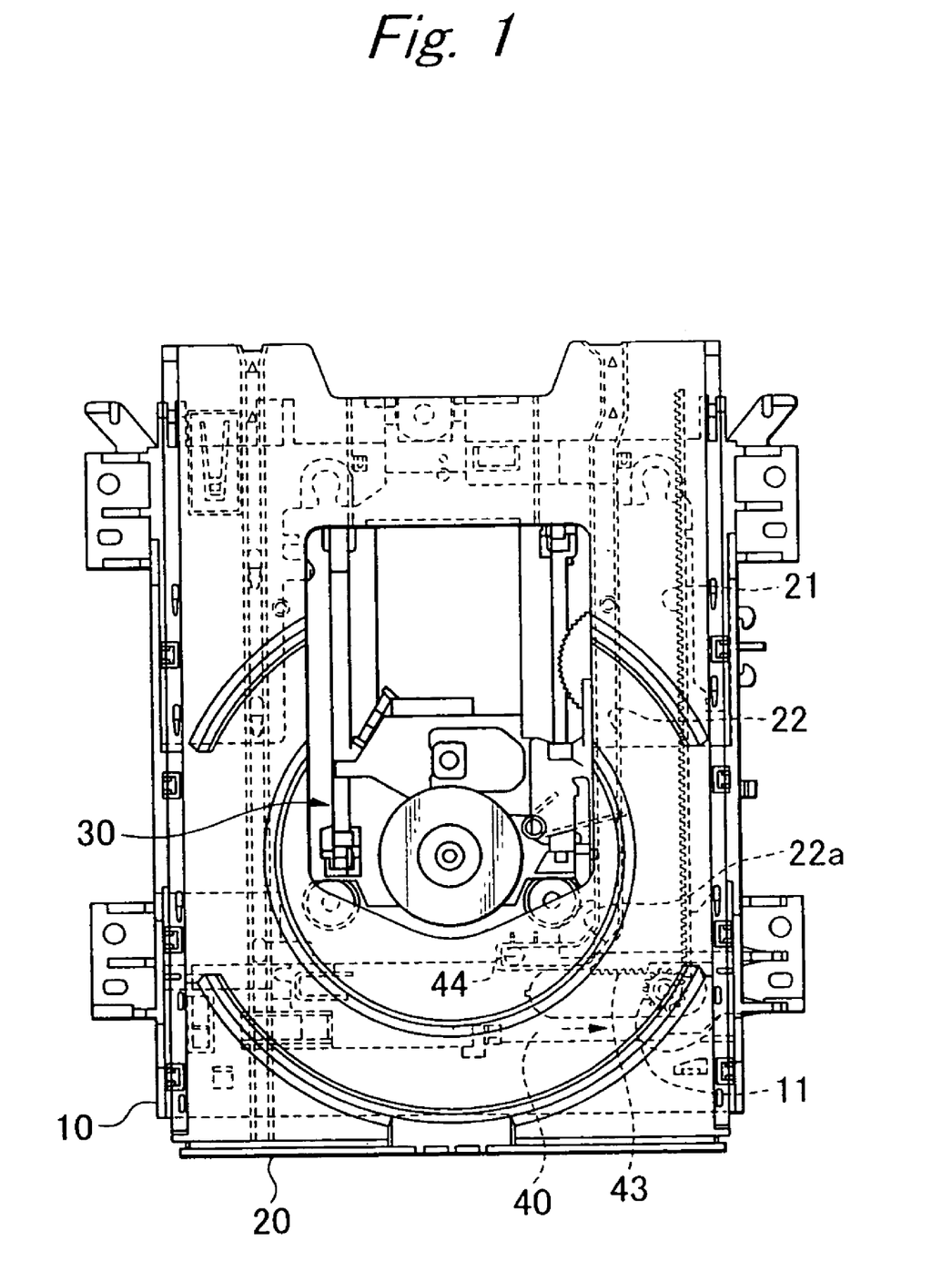
FIG. 1 is a plan view of a disc apparatus according to one embodiment of the present invention with its tray withdrawn in the disc apparatus.
Figure 2:
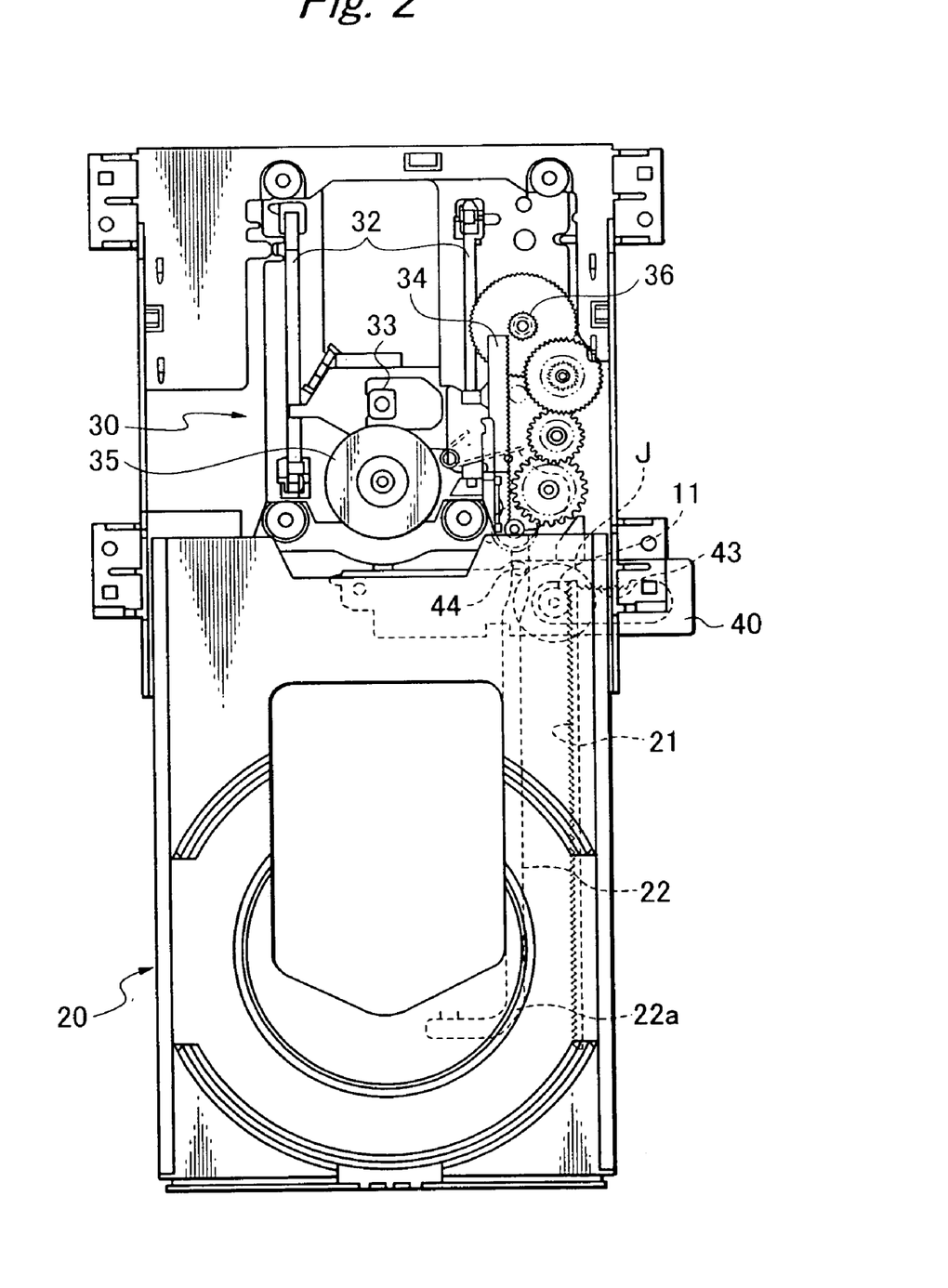
FIG. 2 is a plan view of the disc apparatus with its tray appearing out of the housing.

Referring to FIGS. 1 and 2, a disc apparatus according to one embodiment of the present invention comprises a base frame 10, a disc-carrying tray 20, and a traverse unit 30 pivotally fixed on its rear edge to the base frame 10. Thus, the traverse unit 30 can rotate about its rear edge to incline down, thereby allowing the tray 20 to move from the projecting position (see FIG. 2) to the withdrawing position (see FIG. 1).

The tray 20 has a tray rack 21 and an L-shaped cam slot 22 formed on its lower surface. The traverse unit 30 has an optical pickup 33 movably mounted on its upper surface. Specifically the optical pickup 33 can move on parallel guide rails 32 lying on the traverse chassis 31. The movable pickup 33 has a traverse rack 34 integrally connected to one longitudinal side. Also, the traverse unit 30 has a turntable 35 to support and turn a disc thereon. The turntable 35 is connected to a first drive motor (not shown). A second drive motor M can rotate in opposite directions, and is connected to a gang of gear wheels A–H to attain three different operations, that is, driving the pickup 33 across the disc, inclining the traverse unit 30, and moving the tray 20 between the projecting position and the withdrawing position, as described later in detail.

Figure 3A:
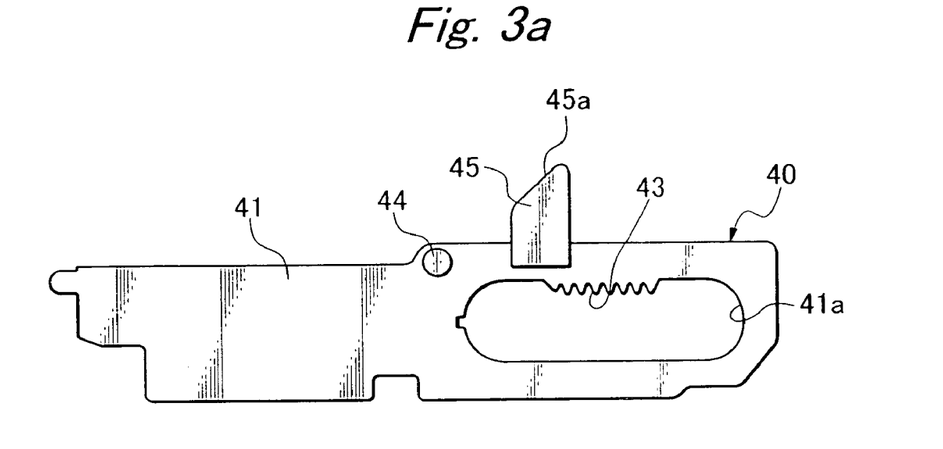
FIGS. 3a, 3b and 3c are plan, front and side views of the lateral slider respectively.
Figure 3B:
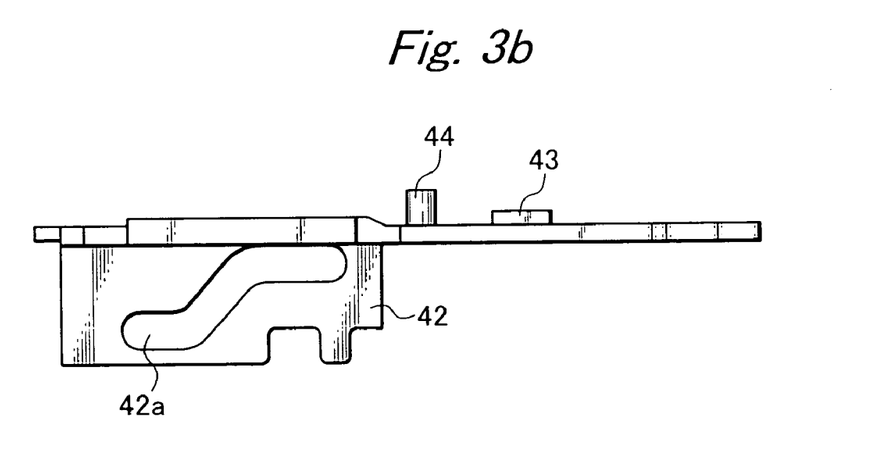
Figure 3C:
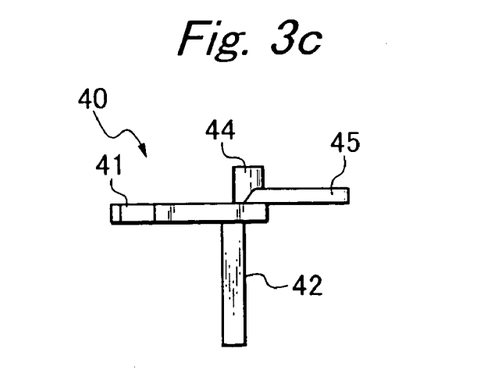

A lateral slider 40 is fixed on the base frame 10 adjacent to the traverse unit 30 slidably in the direction crossing at right angles to the direction of movement of the optical pickup 33. Referring to FIGS. 3a, 3b and 3c, a lateral slider 40 consists of a horizontal long strip 41 and a vertical short strip 42 integrally connected to the horizontal long strip. The horizontal long strip 41 has an ellipse opening 41a made therein, and a rack teeth 43 is formed on one lateral side of the ellipse opening 41a, which a tray-feeding pinion 11 is detachably meshed with the rack teeth 43. The horizontal long strip 41 has also a short guide pin 44 fixed to its upper surface, and a chamfered guide piece 45 integrally connected to and projecting from its rear edge. The guide pin 44 is slidably fitted in the cam slot 22. The chamfered guide piece 45 has a chamfered end 45a to be complementary with the chamfered end of the traverse rack 34. The vertical short strip 42 has an oblique cam slot 42a made therein. The cam slot 42a has upper and lower horizontal portions and oblique portion communicating with the upper and lower horizontal portions.

Figure 4A:
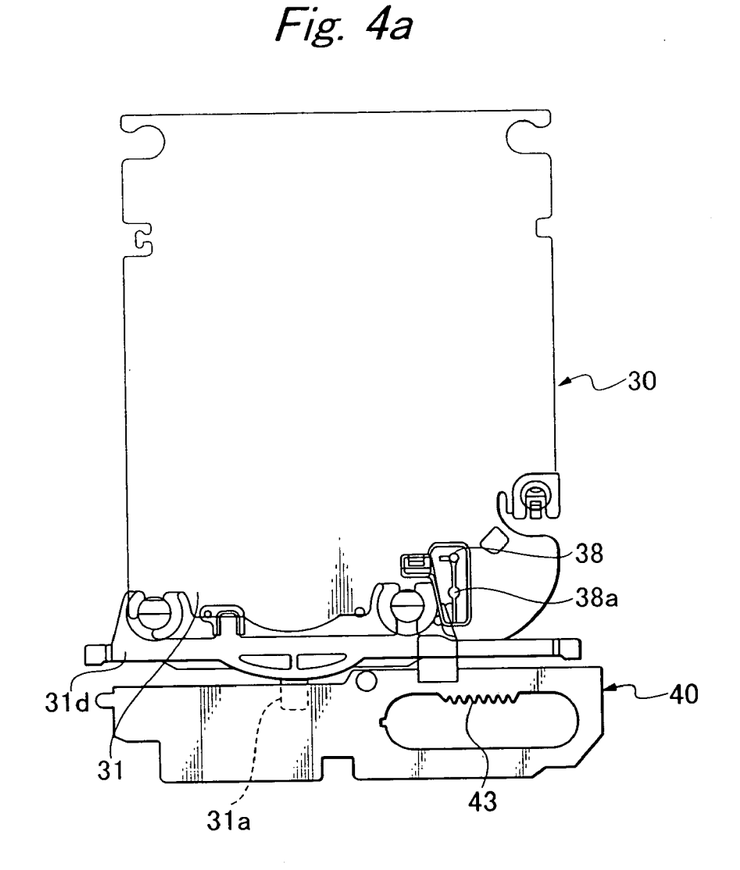
FIGS. 4a and 4b illustrate how the traverse unit is operatively connected to the lateral slider.

Referring to FIG. 4a, a traverse holder 31d is fixed to the front edge of the traverse unit 30 via resilient rubber. The traverse holder 31d has a forward projection 31a formed thereon. The lateral slider 40 is slidably connected both to the traverse unit 30 via the traverse holder 31d and to the tray 20. Specifically the forward projection 31a of the traverse holder 31d is slidably fitted in the cam slot 42a of the lateral slider 40, whereas the guide pin 44 of the lateral slider 40 is slidably fitted in the "L"-shaped cam slot 22 of the tray 20.

Figure 5:
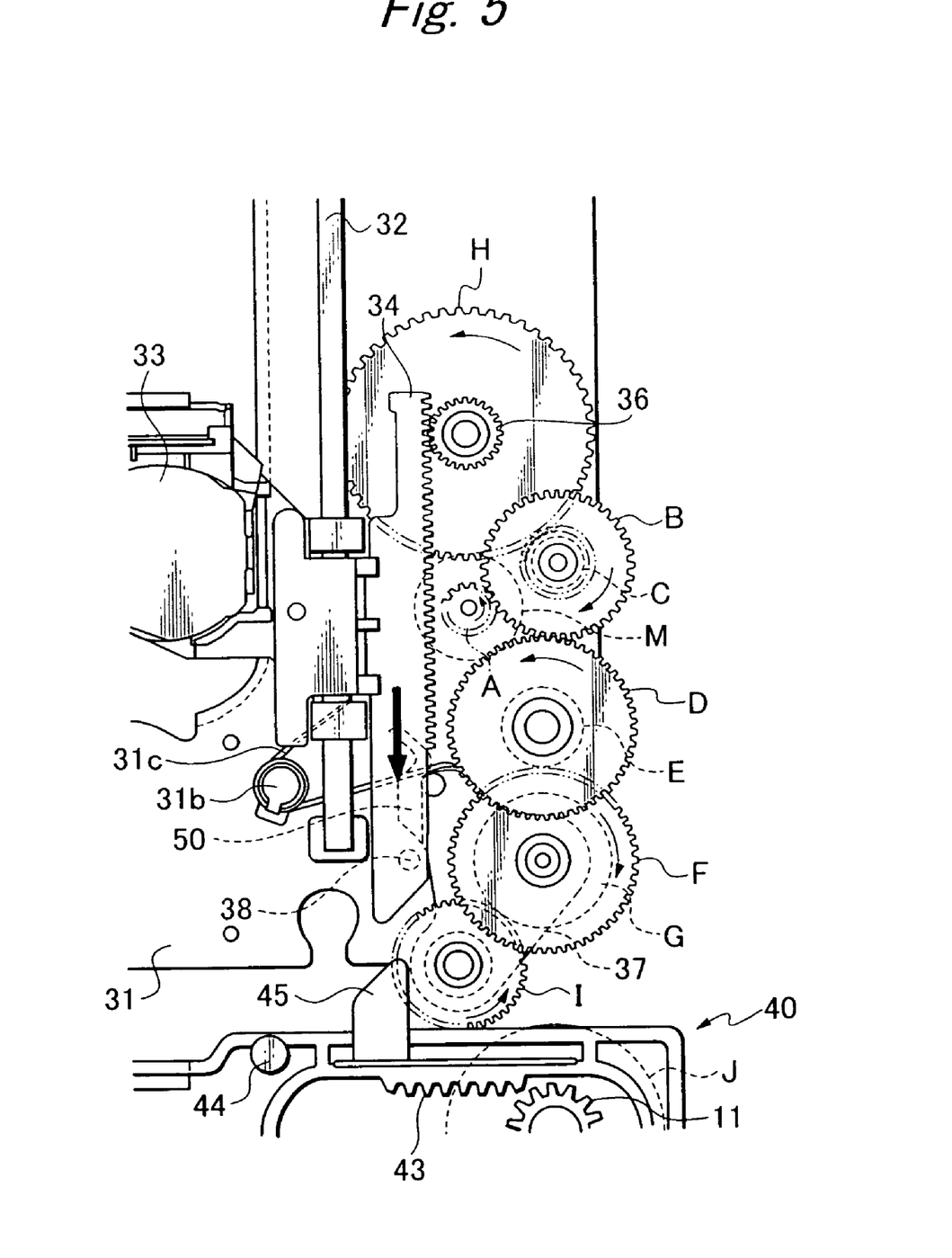
FIG. 5 shows a gang of gear wheels for the motive-force transmission from the motor to different driving mechanisms.

Referring to FIG. 5, the gang of gear wheels for transmitting the motive-force of the second motor to movement of the optical pickup 33, inclination of the traverse unit 30 and driving of the tray 20 include: a small pinion 36 meshing with the traverse rack 34; a rack drive gear wheel H concentric with the pinion 36; a small gear wheel C meshing with the rack drive gear wheel H; a gear wheel B concentric with the small gear wheel C; a drive gear wheel A fixed to the shaft of the second motor M, and meshing with the gear wheel B; a gear wheel D meshing with the gear wheel B; a small gear wheel E concentric with the gear wheel D; a gear wheel F meshing with the small gear wheel E; a gear wheel G concentric with the gear wheel F; a transmission switching gear wheel I meshing with the gear wheel G; a tray drive gear wheel J, which can be brought close to the switching gear wheel I for engagement and apart from it for disengagement.

The pickup drive mechanism includes the traverse rack 34, pinion 36 and some of the gang of gear wheels A, B, C and H, which gang is operatively connected to the second drive motor M. Specifically the drive force is transmitted from the second drive motor M to the traverse rack 34 through the gear wheels A, B, C, H and the small pinion 36. The counter clockwise rotation of the second motor M makes the pickup 33 traverse the disc for reproducing the picture or sound therefrom, and the clockwise rotation makes the pickup return to its initial position.

A tray driving mechanism includes the tray rack 21 and the L-shaped cam slot 22 of the tray 20, and a tray feeding gear wheel J concentrically combined with the tray feeding pinion 11. The switching gear wheel I can be brought close enough to the gear wheel J so that it may mesh with the gear wheel J. Then, the gear wheel J joints the gang of gear wheels via the switching gear wheel I. Thus, the drive force can be transmitted from the second drive motor M to the tray feeding pinion 11, which moves the tray 20 forward when meshing the tray rack 21.

Figure 9:
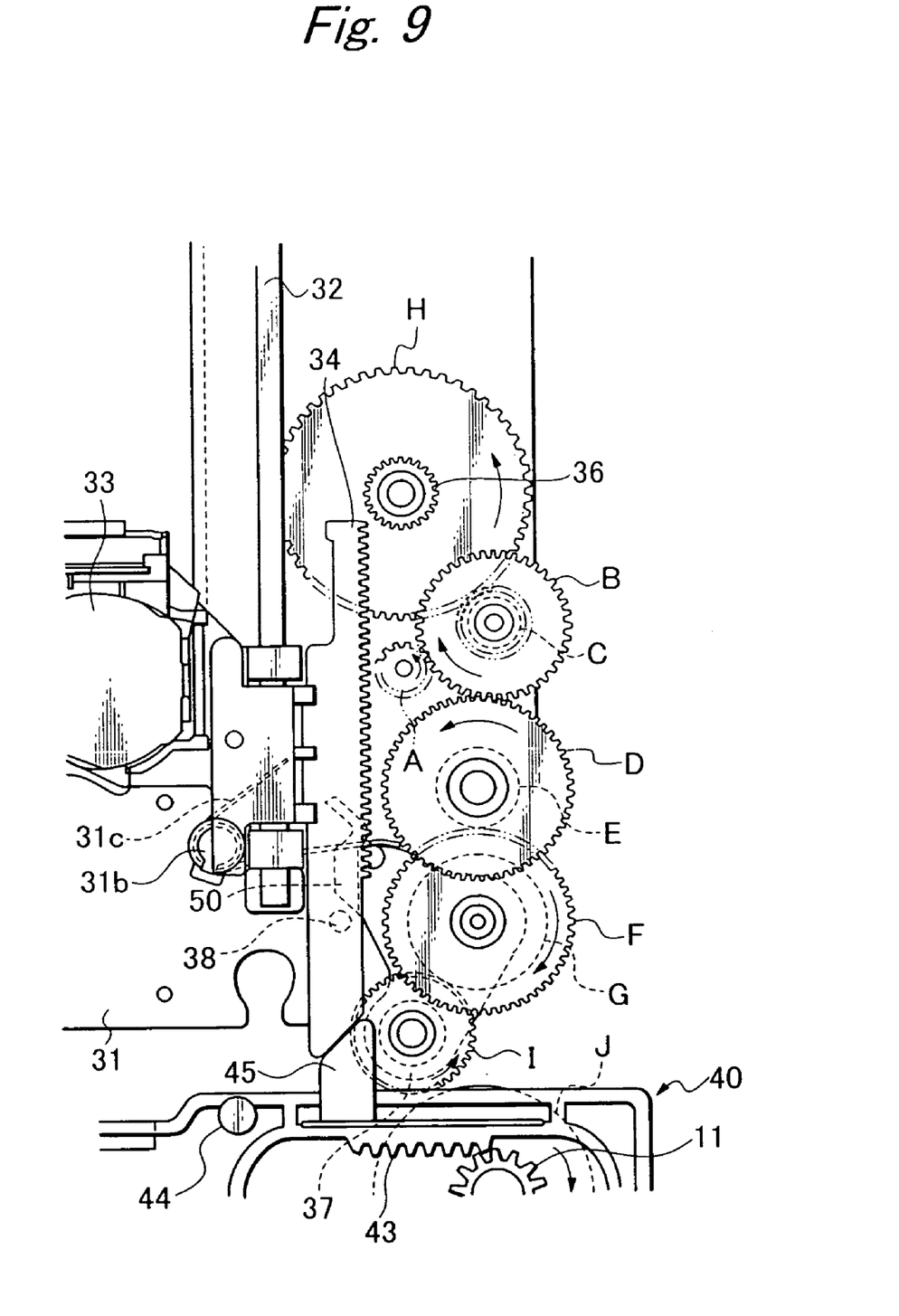
FIG. 9 shows the gang of gear wheels and associated parts, illustrating how the tray driving mechanism can be connected to the gang of gear wheels when the lateral slider is pushed sideways by the traverse rack.

The traverse rack 34 moves forward to abut the chamfered guide piece 45 of the lateral slider 40, pushing the lateral slider 40 aside. Then, the lateral slider 40 moves the distance equal to the width of the traverse rack 34 laterally. Accordingly the guide pin 44 is moved to the lateral-to-longitudinal transition or curved section 22a of the "L"-shaped cam slot 22, so that the tray 20 is unlocked to be set free. Thus, the forward movement of the tray 20 is permitted. On the other hand the tray feeding pinion 11 meshes with the rack 43 of the lateral slider 40, rotating clockwise together with the gear wheel J (see FIG. 9).

A traverse unit inclining mechanism includes the forward projection 31a of the traverse holder 31d and the cam slot 42a of the lateral slider 40. The cam slot 42a defines a low-to-high level transition (see FIG. 3b and FIG. 4b), and the forward projection 31a is slidably fitted in the cam slot 42a. Movement of the lateral slider 40 in one direction makes the forward projection 31 climb the slope up to the high level, and accordingly the traverse unit 30 rotates about its pivot, raising and leveling its front edge whereas movement of the lateral slider 40 in the other direction makes the forward projection 31 gets the slope down to the low level, and accordingly the traverse unit 30 rotates about its pivot, inclining its front edge down. The traverse unit 30 inclines down to give the withdrawing tray 20 the way to the loading position.

Figure 6:
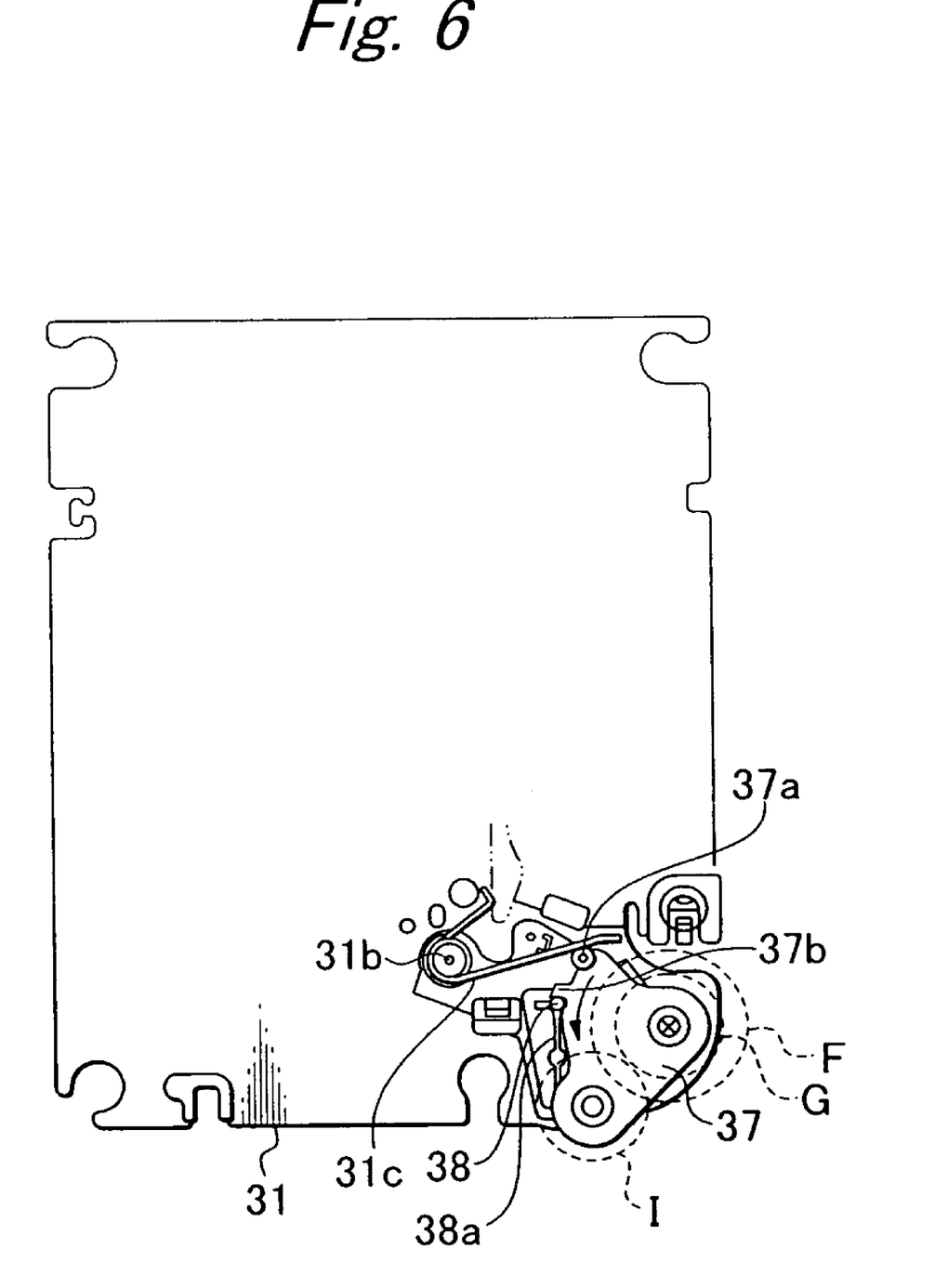
FIG. 6 is a plan view of the traverse chassis illustrating where and how the rotary control piece and associated coiled spring are arranged on the traverse chassis.
Figure 7:
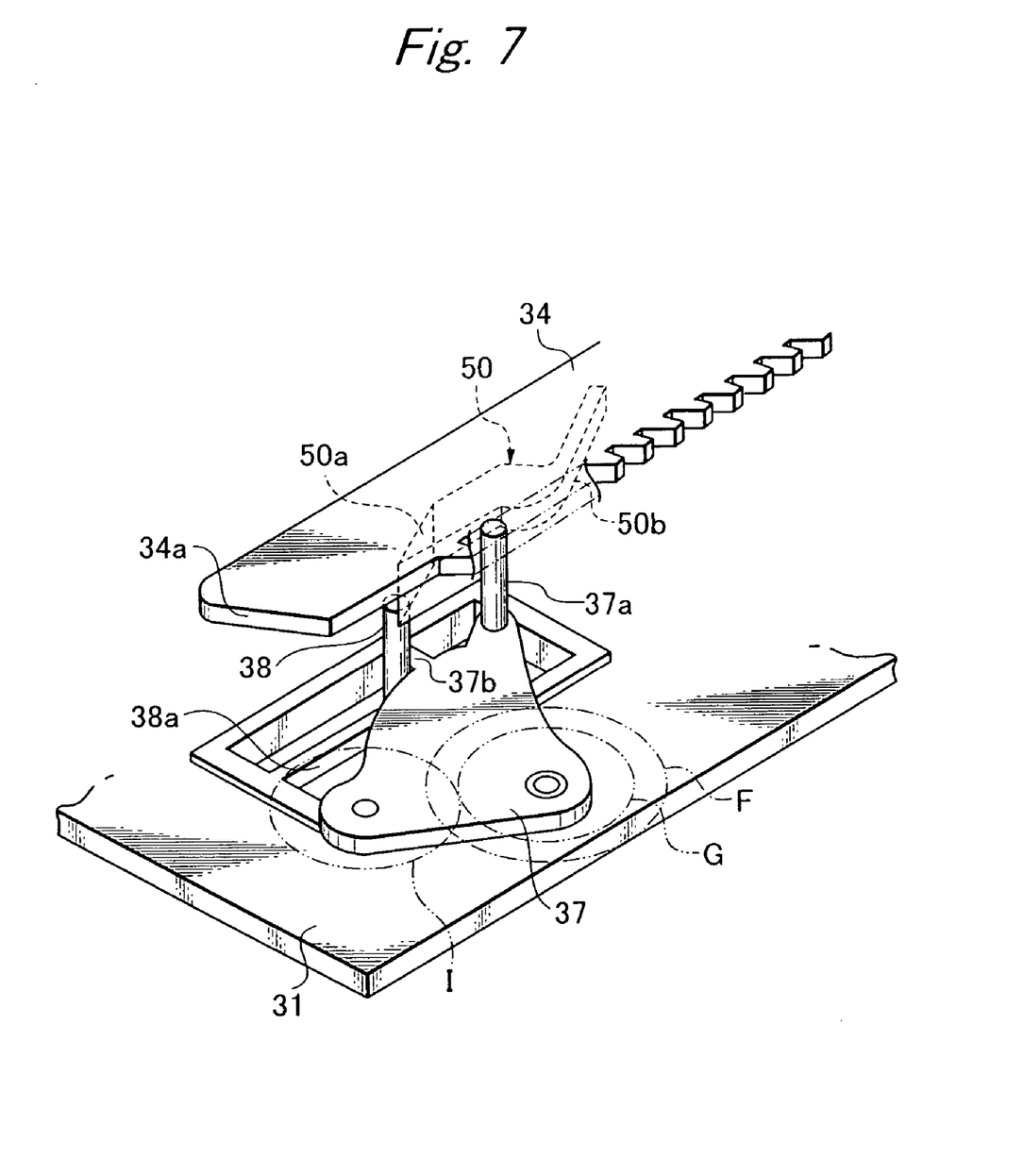
FIG. 7 is a perspective view of the rotary control piece and associated parts, illustrating how the rotary control piece is prevented from rotating by the retainer post.
Figure 11:
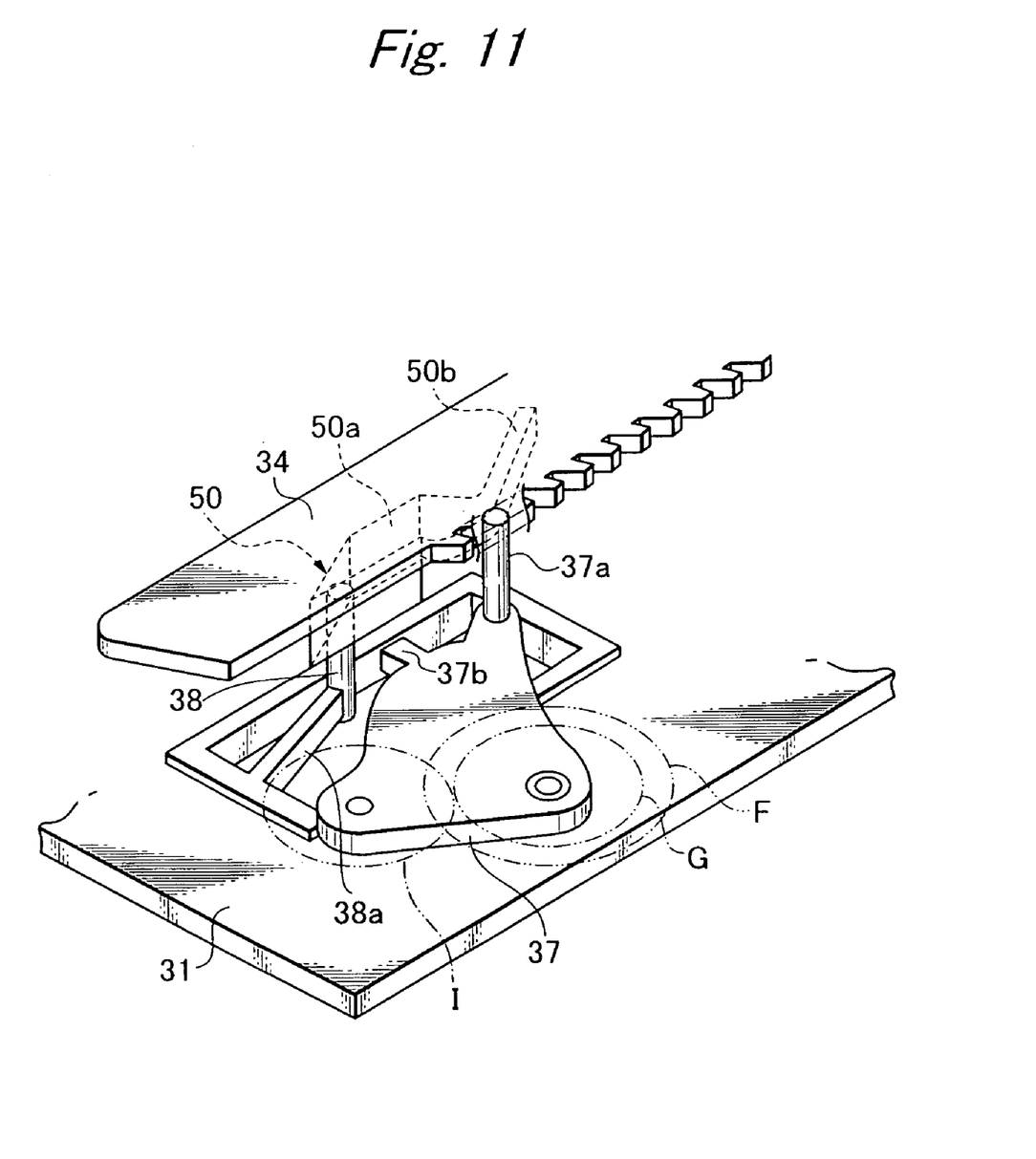
FIG. 11 is a perspective view of the rotary control piece and associated parts, illustrating how the rotary control piece is released from the retainer post.

A transmission switching mechanism comprises a rotary control piece 37 rotatably fixed on the traverse chassis 31, a movable retainer post 38, and a cam rib 50, which is formed on the lower surface of the traverse rack 34 in confronting relation with the rotary control plate 37. Referring to FIGS. 6, 7 and 11, the rotary control piece 37 is substantially triangular and spring-biased toward its counterclockwise rotation by a coiled spring 31c. The transmission switching gear wheel I is fixed to the first angle on its upper surface; the concentric gear wheels G and F are fixed to the second angle on its upper surface; and a catch pin 37a stands upright at the third angle. The first angle swings largest amplitude when the rotary control piece 37 rotates about the concentric center of the gear wheels G and F. The rotary control piece 37 has a projection 37b formed on the curved side between the first and third angles, and is spring-biased toward its counterclockwise rotation.

An outsert molded rectangular frame of a plastic material is press-fitted in the rectangular opening, which is made in the traverse chassis 31. It has a cantilever-like hinge 38a extending inward from one shorter side. The retainer post 38 is integrally connected to the free end of the cantilever-like hinge 38a, and it catches the projection 37b of the rotary control piece 37 to prevent the counterclockwise rotation of the rotary control piece 37, which is normally spring-biased counterclockwise with the coiled spring 31c. In this position the transmission switching toothed-wheel I is kept apart from the tray feeding gear wheel J.

The cam rib 50 is so shaped as to make the rotary control piece 37 release from the retainer post 38 when the traverse rack 34 moves forward, and at the same time the catch pin 37a follow the rib contour thereby allowing the transmission switching gear wheel I to mesh with the tray feeding gear wheel J for feeding forward the tray 20 in response to departure of the traverse rack 34 from the gang of gear wheels. Specifically the cam rib 50 consists of a trapezoid unlocking section 50a for releasing the rotary control piece 37 from the retainer post 38, and a subsequent curved rotation-controlling section 50b for the catch pin 37a to slide thereon for moving the transmission switching gear wheel I to the tray-feeding gear wheel J for engagement. Then, the tray feeding gear-and-pinion combination 11, J join the gang of gear wheels via the intervening transmission switching gear wheel I.

Figure 8A:
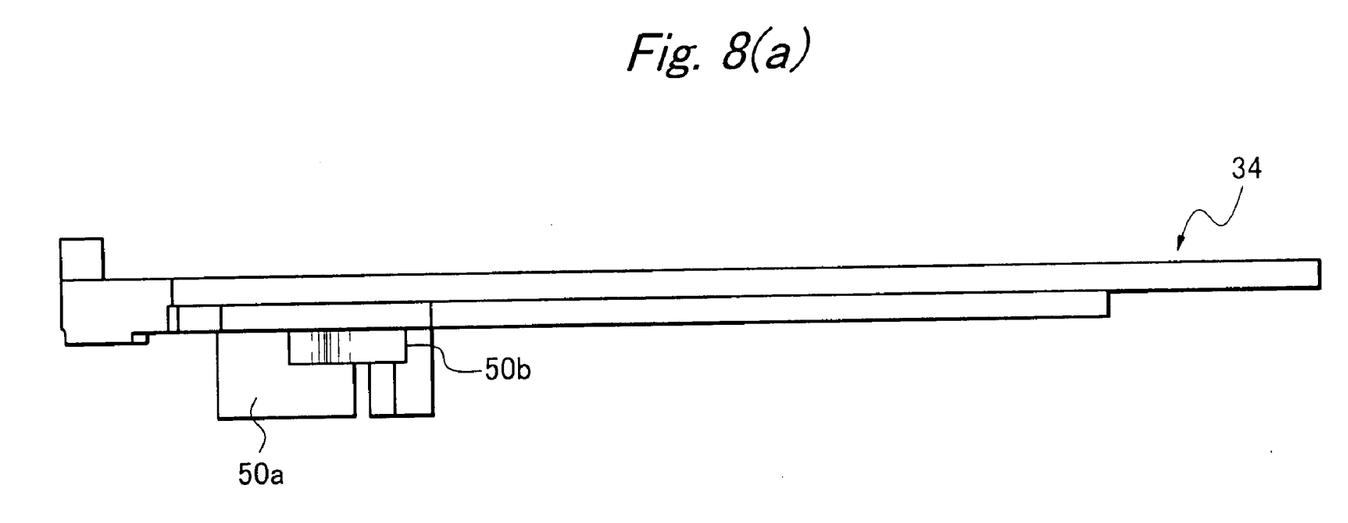
FIGS. 8a and 8b are side and rear views of the traverse rack.
Figure 8B:
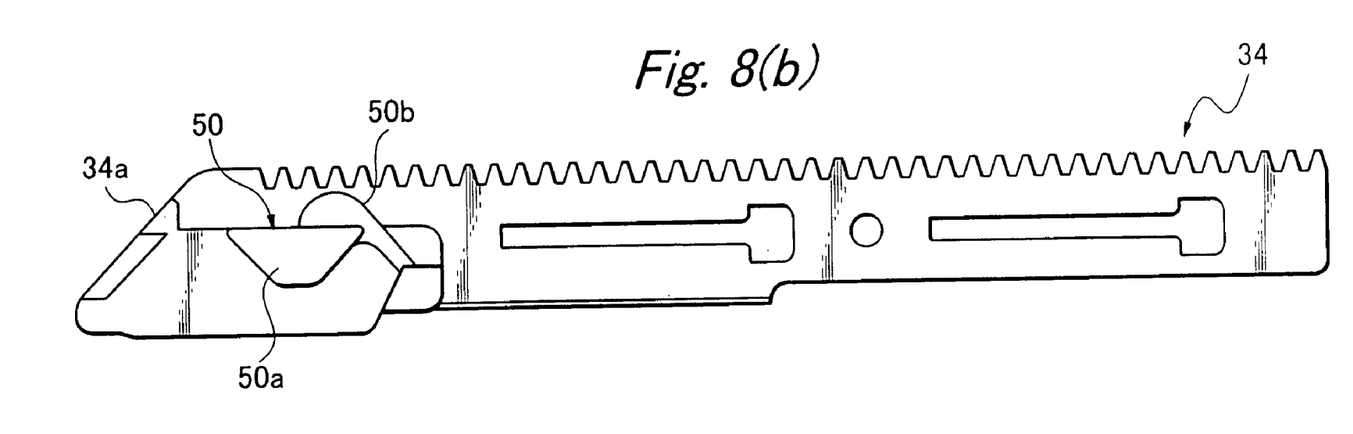

The movable retainer post 38 is shorter than the catch pin 37a, and the trapezoid unlocking section 50a is thicker than the curved rotation-controlling section 50b, as seen from FIGS. 8a and 8b. Thus, the longer catch pin 37a can follow only the rotation-controlling section 50b, whereas the shorter retainer post 38 can follow only the unlocking section 50a. These sections of the cam rib 50 are so sized and positioned that the tray feeding gear wheel 11 and pinion J is coupled with the gang of gear wheels via the intervening transmission switching gear wheel I before the lateral slider 40 reaches the end of the lateral travel and before the traverse rack 34 is disconnected from the pinion 36, and hence the gang of gear wheels.

Now, the operation of the disc apparatus structured as above is described from a status of reproducing a disc to ejection of the disc referring drawings as follows:

Mov m nt of th Optical Pickup

In reproducing the sound and/or pictures from the disc, the optical pickup 33 is driven by the second motor M; the drive power is transmitted to the pickup 33 via the gear wheels A, B, C, H and the rack 34 and pinion 36. Thus, the pickup 33 moves forth along the guide rails 32, 32 at a fixed speed. The pickup 33 moves back when the second motor M is reversed in rotation. The transmission switching gear wheel I is separate from the tray feeding gear wheel J, thereby preventing transmission of the drive force from the second motor M to the tray 20.

Depression of the ejection button on the front console subsequent to termination of reproduction of the information from the disc makes the turntable stop, and at the same time the second drive motor M rotates. Then, the traverse rack 34 moves in the direction in which the tray is pushed out of the apparatus (see FIG. 5). The chamfered end 34a of the traverse rack 34 pushes the counter chamfered end 45a of the guide piece 45 of the lateral slider 40 to push the lateral slider laterally (rightward in FIG. 5). Then, the traverse rack 34 is disconnected from the pinion 36, and the pickup 33 stays there (see FIG. 9). Before department of the traverse rack 34 from the pinion 36, the cam rib 50 of the traverse rack 34 and the coiled spring 31c work together to release the projection 37b of the rotary control piece 37 from the retainer post 38, thus allowing the counterclockwise rotation of the rotary control piece 37 until the transmission switching gear wheel I meshes with the tray feeding gear wheel J.

Down-Inclination of the Traverse Unit

The lateral slider 40 is driven rightward to make the pinion 11 meshes with the rack 43. The tray feeding gear wheel J is already coupled with the train of gear wheels via the intervening transmission switching gear wheel I, and is running along with the pinion 11. Rotation of the pinion 11 moves the lateral slider 40 further rightward.

Figure 4B:
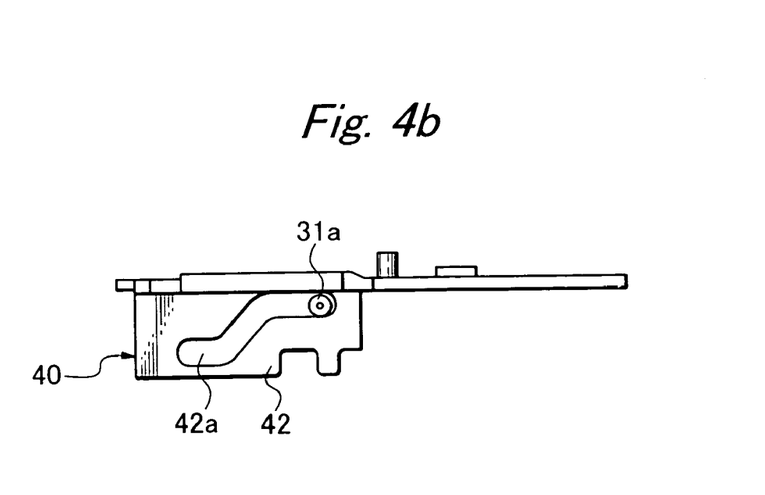
Figure 10:
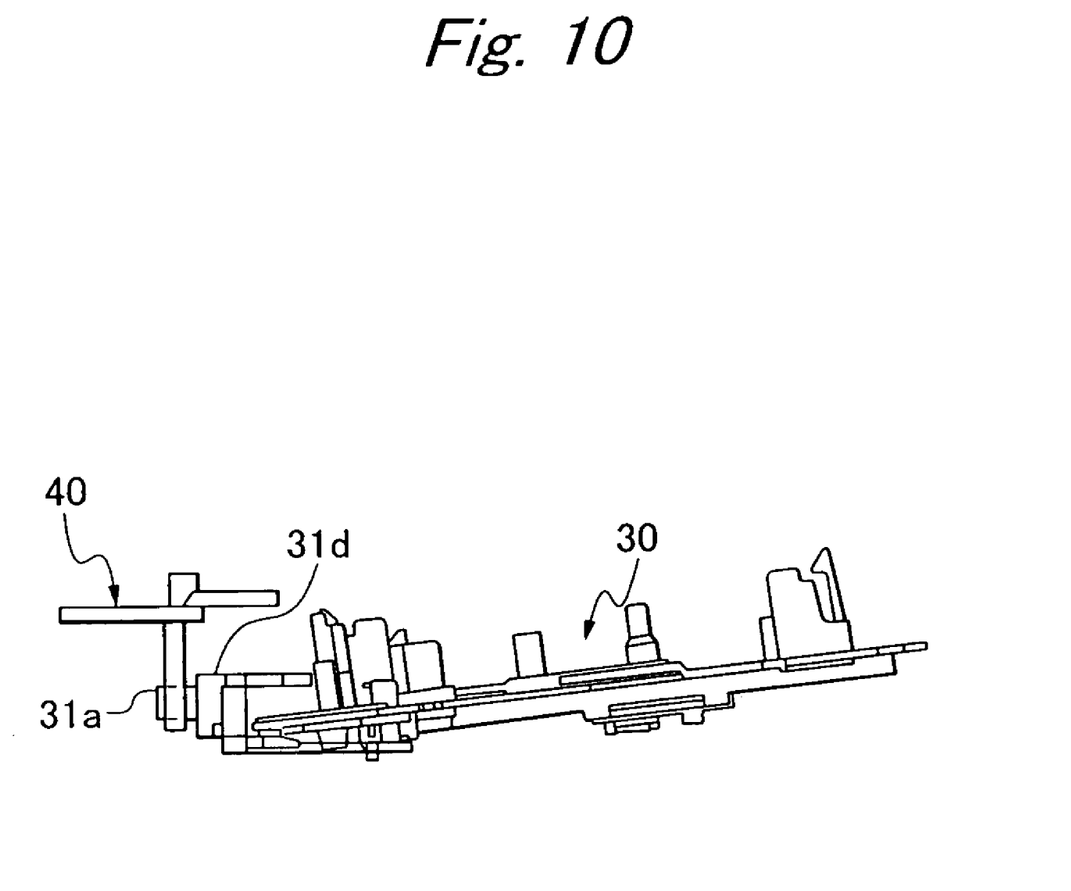
FIG. 10 illustrates how the traverse unit is inclined.

As may be seen from FIG. 4b, the forward projection 31a of the traverse holder 31d comes down the slope of the cam slot 42a of the lateral slider 40. Accordingly the traverse unit 30 inclines down (see FIG. 10). The resilient rubber joint between the traverse holder 31d and the traverse unit 30 is yieldingly bent to reduce a shock to the traverse unit 30.

Movem nt of th Disc Carrying Tray

The lateral movement of the lateral slider 40 makes the guide pin 44 of the lateral slider 40 push the lateral-to-longitudinal transition corner 22a of the L-shaped slot 22, thus permitting the tray 20 to advance outward, and at the same time, the tray feeding pinion 11 meshes with the tray rack 21 to transmit the drive power from the second motor M to the tray 20. The tray feeding pinion 11 is already disconnected from the rack 43 of the lateral slider 40 (see FIG. 2).

In loading the disc apparatus with a disc, the procedure above described is reversed in order: the disc is carried to a predetermined position in the apparatus, and then, the traverse unit 30 comes up and levels off to allow the turntable 35 to support and clamp the disc. Then, the turntable 35 starts rotation while the pickup 33 starts moving across the disc for reproducing the information from the disc.

Referring to FIGS. 12a to 12f, described is the manner in which the cam rib 50 and the rotary control piece 37 work together to allow the transmission switching gear wheel I to couple or decouple from the tray feeding gear wheel J.

Figures 12A, 12B:
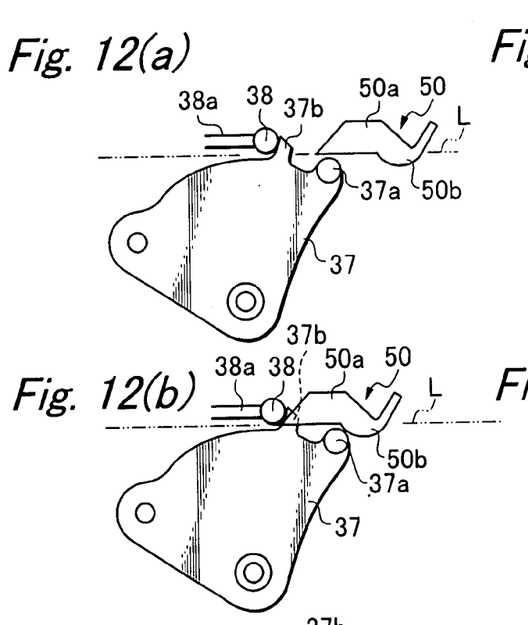
FIGS. 12a to 12h show how the rotary control piece follows the cam rib contour.
Figure 12C:
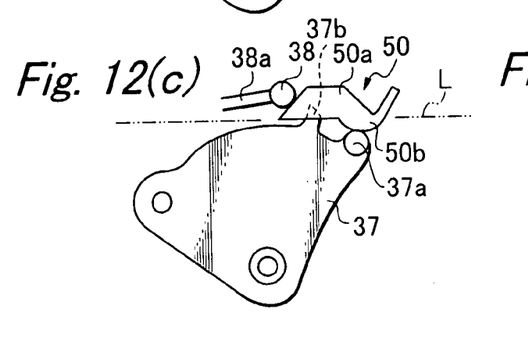

The projection 37b of the rotary control piece 37 is caught by the movable retainer post 38, thereby making the transmission switching gear wheel I separate from the tray feeding gear wheel J (see FIG. 12a).

Depression of the disc-ejection button causes the traverse rack 34 to move in the direction in which the tray carries and removes the disc from the apparatus. When the chamfered end 34a of the traverse rack 34 reaches a predetermined position, the movable retainer post 38 abuts the unlocking section 50a of the rib 50 (see FIG. 12b). Then, the movable retainer post 38 climbs the slope of the trapezoid unlocking section 50a while its cantilever-like hinge 38a is yieldingly bent (see FIG. 11 and FIG. 12c). On the other hand, the catch pin 37a abuts the curved surface of the curved rotation-controlling section 50b (see FIG. 7). Rotation of the rotary control piece 37 is still prevented, keeping the transmission switching gear wheel I separate from the tray feeding gear wheel J.

Figures 12D, 12E:
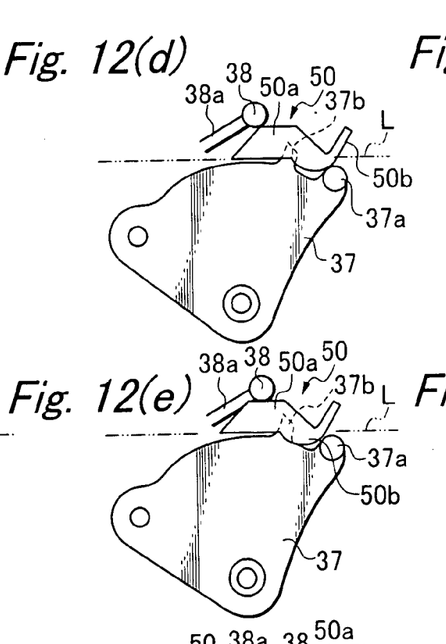

Further movement of the traverse rack 34 makes the movable retainer post 38 reach the top side of the unlocking section 50a, but not allowing rotation of the rotary control piece 37 yet; the catch pin 37a still remains on the curved surface of the rotation-controlling section 50b (see FIG. 12d). The transmission switching gear wheel I remains separate from the tray feeding gear wheel J.

After releasing the projection 37b of the rotary control piece 37 from the retainer post 38, the rotation of the control piece 37 is controlled by the catch pin 37a, which follows the curved rotation-controlling section 50b.

Figure 12F:
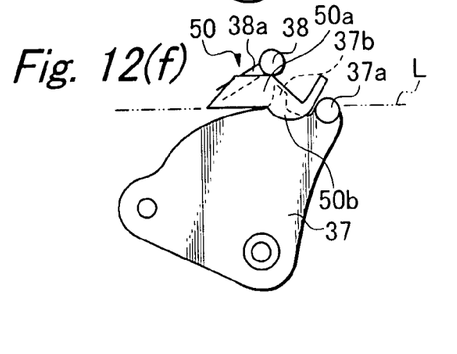
Figures 12G, 12H:
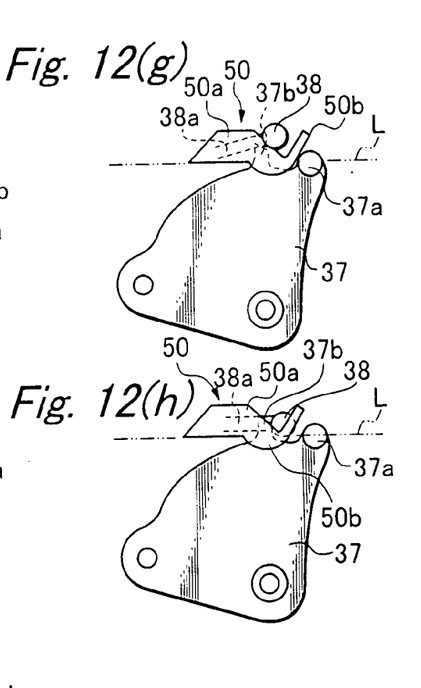

Further advance of the traverse rack 34 makes the catch pin 37a follow the curved surface of the rotation-controlling section 50b rightward in FIG. 7, finally allowing the rotary control piece 37 to turn counterclockwise under the influence of the coiled spring 31c (see FIGS. 12e to 12g). Specifically when the center of the catch pin 37a reaches the line "L" (see FIG. 12h), the transmission switching gear wheel I meshes with the tray feeding gear wheel J. The movable retainer post 38 is shorter than the catch pin 37a, and is short enough not to hit the curved rotation-controlling section 50b. At the final stage the shorter retainer post 38 falls down beyond the unlocking section 50a.

Contrary to the above, in case that: the tray 20 is pulled in the housing; the traverse unit 30 is inclined up and leveled; and the optical pickup 33 is moved across the disc for reproducing, the transmission switching is effected from FIGS. 12h to 12a through FIGS. 12g, f, e, d, c and b.

The transmission changeover mechanism according to the present invention provides the following advantages:

1) the transmission switching gear wheel and the tray feeding gear wheel can be adjusted in respect of their sizes and relative positions to assure that they can timely meet with each other, and no strict allowance is required in determining their sizes and relative positions;

the structure for motive-force transmission changeover is simple, and accordingly the manufacturing cost is low; and all parts of the motive-force transmission changeover mechanism are positioned between the traverse rack and the chassis of the traverse unit, requiring no extra spaces. This contributes significant reduction of the whole size of the recording and/or reproducing device.

What is claimed is:

1. A motive-force transmission changeover mechanism in a disc apparatus comprising: a traverse unit; an optical pickup fixed on the traverse unit and adapted to run on parallel guide rails laid on a chassis of the traverse unit; a traverse holder holding the traverse unit via shock-absorbing members; a drive motor; and a disc-carrying tray to carry a disc for loading and unloading; an optical pickup drive mechanism having a traverse rack integrally connected to the optical pickup, and a gang of gear wheels to be detachably connected to the traverse rack for transmission of driving power of the drive motor; a traverse unit inclining mechanism having a lateral slider having an oblique cam slot and a rack, a forward projection of the traverse holder slidably fitted in the oblique cam slot, and a tray feeding pinion detachably mesh with the rack of the lateral slider; and a tray driving mechanism including a tray rack, an L-shaped cam slot both formed on rear surface of the disc-carrying tray, and a tray feeding gear wheel concentrically combined with the tray feeding pinion;

wherein a rotary control piece is pivotally fixed on the chassis of the traverse unit and being spring-biased to rotate in one direction; a retainer post stands upright on the chassis to prevent rotation of the rotary control piece; an intervening transmission switching gear wheel which makes the tray feeding gear wheel couple or decouple from the gang of gear wheels is rotatably fixed on the rotary control piece; a catch pin is fixed on the upper surface of the rotary control piece; and a cam rib is formed on lower surface of the traverse rack in confronting relation with the rotary control plate which is so configured as to make the rotary control piece release from the retainer post, and at the same time make the catch pin follow the rib contour, thereby allowing the transmission switching gear wheel to couple or decouple from the tray feeding gear wheel.

2. A motive-force transmission changeover mechanism according to claim 1, wherein the traverse rack has a chamfered end whereas the lateral slider has a guide piece its end so chamfered as to be complementary with the chamfered end of the traverse rack, whereby forward movement of the traverse rack laterally drives the lateral slider to allow the rack of the lateral slider to mesh with the tray feeding pinion.

3. A motive-force transmission changeover mechanism according to claim 1, wherein the cam rib is consisted of a trapezoid unlocking section for releasing the rotary control piece from the retainer post, and a subsequent curved rotation-controlling section for the catch pin to slide thereon.

4. A motive-force transmission changeover mechanism according to claim 3, wherein the trapezoid unlocking section and the curved rotation-controlling section of the cam rib are so sized, shaped and positioned that the transmission switching gear wheel is coupled with the tray feeding gear wheel before the lateral slider reaches the end of the lateral travel, and before the traverse rack is disconnected from a pinion in the gang of gear wheels.

* * * * *